(12) United States Patent
Lin

(10) Patent No.: US 12,425,666 B2
(45) Date of Patent: Sep. 23, 2025

(54) RECORDING AND PUSH-BASED STREAMING METHOD AND APPARATUS, DEVICE, AND MEDIUM

(71) Applicant: Beijing Bytedance Network Technology Co., Ltd., Beijing (CN)

(72) Inventor: Dongpeng Lin, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 171 days.

(21) Appl. No.: 18/555,506

(22) PCT Filed: Apr. 15, 2022

(86) PCT No.: PCT/CN2022/087201
§ 371 (c)(1),
(2) Date: Oct. 13, 2023

(87) PCT Pub. No.: WO2022/218425
PCT Pub. Date: Oct. 20, 2022

(65) Prior Publication Data
US 2024/0205463 A1 Jun. 20, 2024

(30) Foreign Application Priority Data
Apr. 15, 2021 (CN) .......................... 202110407837.8

(51) Int. Cl.
*H04N 21/233* (2011.01)
*H04N 21/2187* (2011.01)
*H04N 21/24* (2011.01)

(52) U.S. Cl.
CPC ....... *H04N 21/233* (2013.01); *H04N 21/2187* (2013.01); *H04N 21/2402* (2013.01)

(58) Field of Classification Search
CPC ............. H04N 21/233; H04N 21/2187; H04N 21/2402
See application file for complete search history.

(56) References Cited

U.S. PATENT DOCUMENTS 11,610,605 B1 * 3/2023 Sanders .................... G06F 1/26
2005/0066351 A1    3/2005 Robson
(Continued)

FOREIGN PATENT DOCUMENTS

CN       103280232 A    9/2013
CN       104519191 A    4/2015
(Continued)

OTHER PUBLICATIONS

China National Intellectual Property Administration, Office Action and Search Report Issued in Application No. 202110407837.8, Apr. 28, 2024, 16 pages.
(Continued)

*Primary Examiner* — Thai Q Tran
*Assistant Examiner* — Jose M Mesa
(74) *Attorney, Agent, or Firm* — Alleman Hall & Tuttle LLP

(57) ABSTRACT

An embodiment of the present disclosure relates to a recording and push-based streaming method and apparatus, a device, and a medium. The method includes: collecting audio recording data through a target program running in a background during a live streaming process; acquiring preset audio data when determining that there is a recording failure; and replacing the audio recording data with the preset audio data and sending the preset audio data to a push-based streaming terminal for push-based streaming.

20 Claims, 5 Drawing Sheets

(56) References Cited

U.S. PATENT DOCUMENTS

| | | |
|---|---|---|
| 2007/0168691 A1 | 7/2007 | Srivastava et al. |
| 2009/0238536 A1* | 9/2009 | Gratton .............. H04N 21/4341 386/E5.028 |
| 2013/0058619 A1* | 3/2013 | Miyakawa ........... H04N 9/8205 386/E5.052 |
| 2015/0023345 A1 | 1/2015 | Schechner et al. |
| 2016/0007083 A1 | 1/2016 | Gurha |
| 2017/0131967 A1 | 5/2017 | Nieuwenhuys et al. |
| 2019/0364303 A1 | 11/2019 | Zhu |
| 2020/0150919 A1 | 5/2020 | Rand et al. |

FOREIGN PATENT DOCUMENTS

| | | |
|---|---|---|
| CN | 106412662 A | 2/2017 |
| CN | 107066229 A | 8/2017 |
| CN | 107797887 A | 3/2018 |
| CN | 107948666 A | 4/2018 |
| CN | 104519191 B | 5/2018 |
| CN | 108012161 A | 5/2018 |
| CN | 108347623 A | 7/2018 |
| CN | 109714249 A | 5/2019 |
| CN | 110661926 A | 1/2020 |
| CN | 112207811 A | 1/2021 |
| CN | 112492340 A | 3/2021 |
| CN | 112637341 A | 4/2021 |
| CN | 114257572 A | 3/2022 |
| WO | 2012097752 A1 | 7/2012 |
| WO | 2020103070 A1 | 5/2020 |

OTHER PUBLICATIONS

China National Intellectual Property Administration, Notice of Allowance Issued in Application No. 202110407837.8, Jul. 29, 2024, 4 pages.

China National Intellectual Property Administration, Office Action and Search Report Issued in Application No. 202110407837.8, Jun. 29, 2023, 10 pages. Submitted with partial English translation.

ISA China National Intellectual Property Administration, International Search Report and Written Opinion Issued in Application No. PCT/CN2022/087201, Jul. 6, 2022, WIPO, 18 pages.

* cited by examiner

RECORDING AND PUSH-BASED STREAMING METHOD AND APPARATUS, DEVICE, AND MEDIUM

CROSS REFERENCE OF RELATED APPLICATIONS

The present application is a national stage of International Application No. PCT/CN2022/087201, filed on Apr. 15, 2022, which claims priority to Chinese Patent Application No. 202110407837.8, filed to China National Intellectual Property Administration on Apr. 15, 2021. Both of the aforementioned applications are hereby incorporated by reference in their entireties.

TECHNICAL FIELD

The present disclosure relates to the field of terminal technology, in particular, to a recording and push-based streaming method and apparatus, a device, and a medium.

BACKGROUND

With the continuous development of internet technology, live streaming has gradually become an important form of entertainment for people.

The screen-recorded live streaming is a way of live streaming, which is achieved by acquiring the image, sound, and ambient sound played by the anchor terminal and transmitting them to the audience. There may be interruption in recording due to various reasons during the recording process of the anchor terminal, which leads to an abnormal push-based streaming. Currently, this may be resolved on the push-based streaming terminal, but if the push-based streaming terminal may not be operated, the abnormal push-based streaming still may not be resolved.

SUMMARY

In order to solve the above technical problem or at least partially solve them, the present disclosure provides a recording and push-based streaming method and apparatus, a device, and a medium.

The embodiment of the present disclosure provides a recording and push-based streaming method, which includes:
  collecting audio recording data through a target program running in a background during a live streaming process;
  acquiring preset audio data when determining that there is a recording failure; and
  replacing the audio recording data with the preset audio data and sending the preset audio data to a push-based streaming terminal for push-based streaming.

The embodiment of the present disclosure further provides a recording and push-based streaming apparatus, which includes:
  a data collecting module, configured to collect audio recording data through a target program running in a background during a live streaming process;
  a recording failure module, configured to acquire preset audio data when determining that there is a recording failure; and
  a recording replacement module, configured to replace the audio recording data with the preset audio data and sending the preset audio data to a push-based streaming terminal for push-based streaming.

The embodiment of the present disclosure further provides an electronic device, which includes: a processor; a memory configured to store an executable instruction of the processor; the processor is configured to read the executable instruction from the memory and execute the instruction to enable the electronic device to implement the recording and push-based streaming method as provided by the embodiment of the present disclosure.

The embodiment of the present disclosure further provides a computer-readable storage medium, where the storage medium stores a computer program that, when executed by a computing device, the computer program enables the computing device to implement the recording and push-based streaming method as provided by the embodiment of the present disclosure.

The embodiment of the present disclosure further provides a computer program product that, when running on a computing device, the computer program product enables the computing device to implement the recording and push-based streaming method as provided by the embodiment of the present disclosure.

The embodiment of the present disclosure further provides a computer program that, when executed by a processor, the computer program implements the recording and push-based streaming method as provided by the embodiment of the present disclosure.

BRIEF DESCRIPTION OF DRAWINGS

The above and other features, advantages, and aspects of each embodiment of the present disclosure will become more apparent in combination with the accompanying drawings and making reference to the following specific implementations. Throughout the accompanying drawings, same or similar reference numerals represent same or similar elements. It should be understood that the accompanying drawings are illustrative, and the component and element may not necessarily be drawn to scale.

DESCRIPTION OF EMBODIMENTS

Embodiments of the present disclosure will be described in more detail below with reference to accompanying drawings. Even though certain embodiments of the present disclosure are shown in the accompanying drawings, it should be understood that the present disclosure may be implemented in various forms and should not be construed as limited to the embodiments set forth herein, but rather the provided embodiments are for a purpose of a more thorough and complete understanding of the present disclosure. It should be understood that the accompanying drawings and embodiments of the present disclosure are only for exemplary purposes, and are not intended to limit a protection scope of the present disclosure.

It should be understood that various steps described in method embodiments of the present disclosure may be performed in different orders and/or in parallel. Furthermore, the method embodiments may include additional steps and/or illustrated steps that are omitted to perform. A scope of the present disclosure is not limited herein.

As used herein, a term "including" and variations thereof are open-ended inclusions, i.e., "including but not limited to"; the term "based on" is "based at least in part on"; the term "one embodiment" means "at least one embodiment"; the term "another embodiment" means "at least one additional embodiment"; the term "some embodiments" means "at least some embodiments". Relevant definitions of other terms will be given in the description below.

It should be noted that concepts such as "first" and "second" mentioned in the present disclosure are only used to distinguish different apparatus, modules or units, and are not used to limit an order of functions performed by these apparatus, modules or units, or interdependence of thereto.

It should be noted that modifications of "a" and "a plurality" mentioned in the present disclosure are illustrative rather than restrictive, and those skilled in the art should understand that they should be understood as "one or a plurality of" unless the context clearly indicates otherwise.

The names of the message or information interacted between multiple apparatuses in the implementations of the present disclosure are for illustrative purposes only and are not intended to limit the scope of these message or information.

Figure 1:
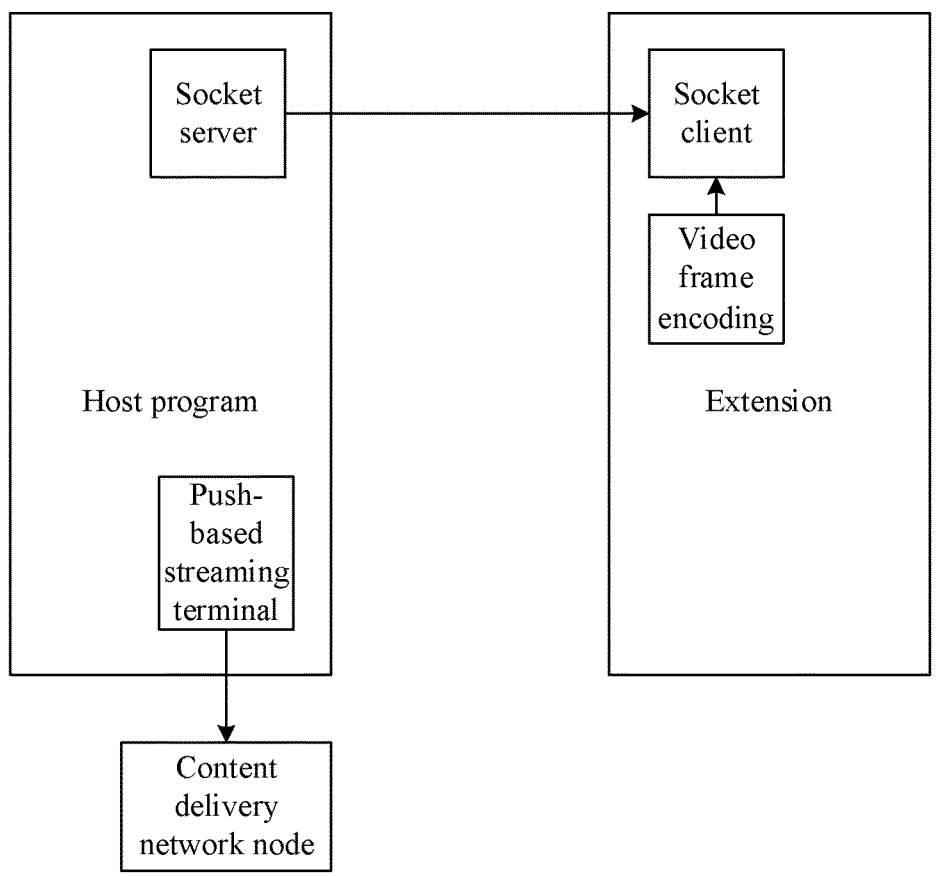
FIG. 1 is a live streaming schematic diagram provided by an embodiment of the present disclosure.

The screen-recorded live streaming is a way of live streaming, which is achieved by acquiring the image, sound, and ambient sound played by the anchor terminal and transmitting them to the audience. FIG. 1 is a live streaming schematic diagram provided by an embodiment of the present disclosure, as shown in FIG. 1, the extension is an independent process that parasitizes on the host program, thus involving communication between two processes, where the specific process may include: 1, the host program starts the extension and starts the socket server to detect the connection; 2, after the extension starts, establish a socket connection to the host program for communication; 3, the extension performs callback and output for the video, the application sound, and the ambient sound through the Replaykit framework, and sends the data and application source stream obtained from hard coding of video frames back to the host program through the socket; 4, the host program obtains video and audio information and pushes it to the content delivery network node through the push-based streaming terminal. As the collecting of the ambient sound of the extension is user selectable and may not be controlled through code, and the host program is backed off to the background in a normal push-based streaming scenario, the general practice is to discard the ambient sound of the extension and the host program will record it on its own.

During the process of the aforementioned screen-recorded live streaming, when the host program is backed off by the user to the background and starts other applications, the operations carried out by other applications may cut off the recording, resulting in sound problems and inability to provide the audio stream, thus preventing normal push-based streaming. Currently, it may be resolved on the push-based streaming terminal, but if the push-based streaming terminal may not be operated, the abnormal push-based streaming still may not be eliminated. To address the above issues, the embodiment of the present disclosure provides a recording and push-based streaming method, which will be introduced in conjunction with the specific embodiments below.

Figure 2:
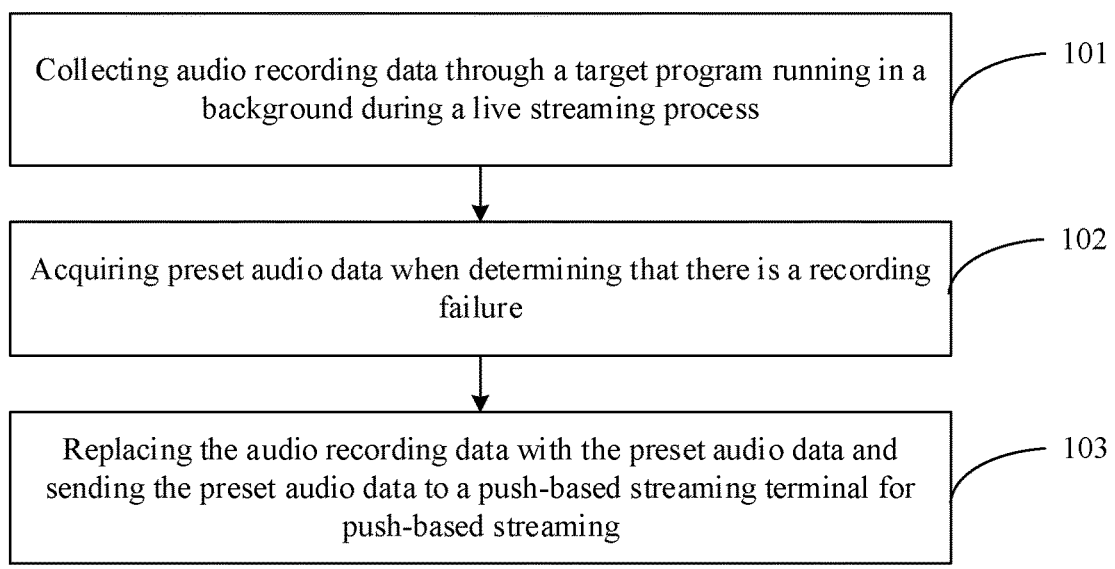
FIG. 2 is a schematic flowchart of a recording and push-based streaming method provided by an embodiment of the present disclosure.

FIG. 2 is a schematic flowchart of a recording and push-based streaming method provided by an embodiment of the present disclosure, the method may be executed by a recording and push-based streaming apparatus, where the apparatus may be implemented with software and/or hardware and may generally be integrated into an electronic device. As shown in FIG. 2, the method includes the following steps.

Step 101, collecting audio recording data through a target program running in a background during a live streaming process.

The live streaming refers to a live streaming manner in which the live streaming terminal needs to record and push the audio data obtained from the recording to other user ends. The embodiment of the present disclosure takes the screen-recorded live streaming manner as an example for explanation. The target program refers to an application program configured for achieving live streaming and recording, and the specific application program used is not limited. For example, the target program may be a short video program or a live streaming program etc. The audio recording data may be the audio data collected by the target program in the current environment, which may include the voice of the live streaming user and the ambient sound of the host user and the like.

In an embodiment of the present disclosure, after a live streaming user initiates a live streaming, the target program may be activated to enable the recording function, and the live streaming terminal may switch the target program to the background for running after receiving the trigger operation from the live streaming user, and the target program running in the background may collect audio data in the current environment to obtain the audio recording data during the live streaming process.

The live streaming manner targeted in this solution allows the live streaming terminal to start other applications after switching the target program to the background for running, where the audio and/or video data of other applications may also be transmitted to the push-based streaming terminal. Due to the possibility that the audio data of other applications may also be affected by the terminal and may not be resumed due to system limitation to the terminal, the audio recording data is used as the audio main track for pushing data by the push-based streaming terminal in this solution.

Step 102, acquiring preset audio data when determining that there is a recording failure.

The recording failure means that the recording of the target program is interrupted or cut off due to various reasons, where the above interruption is mainly due to the operation for sound types of other applications or the extensions, such as the game real-time clock (RTC) connection of microphone, plugging and unplugging headphone, connecting and disconnecting Bluetooth headphone or other Bluetooth device, voice assistant, voice call, etc. The preset audio data refers to a preset segment of audio data without content, where the preset audio data may be white noise in the embodiment of the present disclosure, and the size and/or callback and output frequency of the preset audio data are the same as the size and/or callback and output frequency of the audio recording data. For example, the size of white noise is 4096 bytes, and a GCD timer is configured to provide stable frequency callback.

In the embodiment of the present disclosure, determining the recording failure may include: obtaining a timestamp of the audio recording data at a preset time interval; and determining that the recording fails when the timestamp of the audio recording data stops updating. The preset time interval may be set according to the actual situation. Specifically, after the live streaming terminal starts the recording, a timer may be started to detect the timestamp of the audio recording data at the preset time interval. If the timestamp stops the updating compared to the last detection, determines that there is a recording failure; otherwise, continues timing detection of the timestamp.

In existing solution, the detection on the recording failure is usually achieved by detecting interruption in the recording, but the manner may not cover all interruption scenarios, which may result in missed detection in some interrupted recording scenarios. In the embodiment of the present disclosure, the timing detection of the timestamp is configured to detect whether there is a recording failure, which improves the reliability of the detection and covers a wider range of scenarios.

In the embodiment of the present disclosure, after determining that there is a recording failure, the method may further include: starting a background keep-alive operation for the target program. In an embodiment, the starting the background keep-alive operation for the target program includes: keeping running of the target program in the background by looping target audio data in a silent state. The target audio data refers to audio data that is preset, and the specific content is not limited. Specifically, due to recording through the target program, the target program may be closed in the background when the recording fails. Therefore, the background keep-alive operation may be started for the target program in the embodiment of the present disclosure. The live streaming terminal may control the target program to play the target audio data in a silent state to keep the target program running in the background. By silently playing the target audio data, it has significant advantages in terms of power consumption, network occupancy, availability, and security permissions. The above implementations are only examples, and other implementations may also be applicable.

In the above solution, the background keep-alive operation of the target program after the recording failure may avoid an abnormal push-based streaming of the live streaming caused by the target program being closed, thereby the stability of the push-based streaming is improved.

Step 103, replacing the audio recording data with the preset audio data and sending the preset audio data to a push-based streaming terminal for push-based streaming.

The push-based streaming terminal may be configured to receive the data from the live streaming terminal and push it to other user terminal. During the live streaming process, the data acquired by the live streaming terminal needs to be transmitted through the network, which process is known as the push-based streaming, and which may be realized through the software development kit (SDK) for push-based streaming. The SDK for push-based streaming may be configured in the host program as a tool of push-based streaming for live streaming client.

In the embodiment of the present disclosure, after determining that there is a recording failure, the audio recording data may be replaced with the preset audio data, that is, the preset audio data will be sent to the push-based streaming terminal for push-based streaming the preset audio data to other user terminal by the push-based streaming terminal, ensuring the stability of the push-based streaming.

In the embodiment of the present disclosure, the recording and push-based streaming method may further include: displaying recording failure prompt information to a user; and switching, based on a triggering operation of the user, the target program from running in the background to running in a foreground, and re-actuating a recording switch of the target program to resume the collecting of the audio recording data. In an embodiment, the recording and push-based streaming method may further include: stopping a background keep-alive operation of the target program, and replacing the preset audio data with re-collected audio recording data and sending the re-collected audio recording data to the push-based streaming terminal.

The recording failure prompt information may be prompt information configured to remind the user of the current recording problem, and the specific form and content are not limited in the embodiment of the present disclosure. Specifically, the live streaming terminal may display the recording failure prompt information to the user after determining that there is a recording failure, to guide the user back to the target program, and the live streaming terminal may switch the target program from running in the background to running in the foreground by detecting the triggering operation of the user, and after the triggering operation of the user on the recording switch is received, the recording switch of the target program is started to re-execute the recording operation, thus the audio recording data continues to be collected. In an embodiment, the live streaming terminal may also control the target program to restart the recording switch in the background firstly to resume the recording, and the above operation of guiding the user to resume the recording may be performed when the background restart fails.

Afterwards, as the recording has been resumed, it is possible to stop the background keep-alive operation of the target program and stop sending the preset audio data, and the re-collected audio recording data will be sent to the push-based streaming terminal to resume the normal push-based streaming.

The recording and push-based streaming solution provided by the embodiment of the present disclosure collects audio recording data through a target program running in a background during a live streaming process; acquires preset audio data when determining that there is a recording failure; and replaces the audio recording data with the preset audio data and sends the preset audio data to a push-based streaming terminal for push-based streaming. With the above technical solution, the preset audio data may be configured to replace the audio recording data and send the preset audio data to the push-based streaming terminal when the recording is failed during the live streaming process, which ensures the normal push-based streaming of the live streaming to avoid push-based streaming interruption caused by the recording failure, and improve the stability and reliability of push-based streaming for the live streaming.

Figure 3:
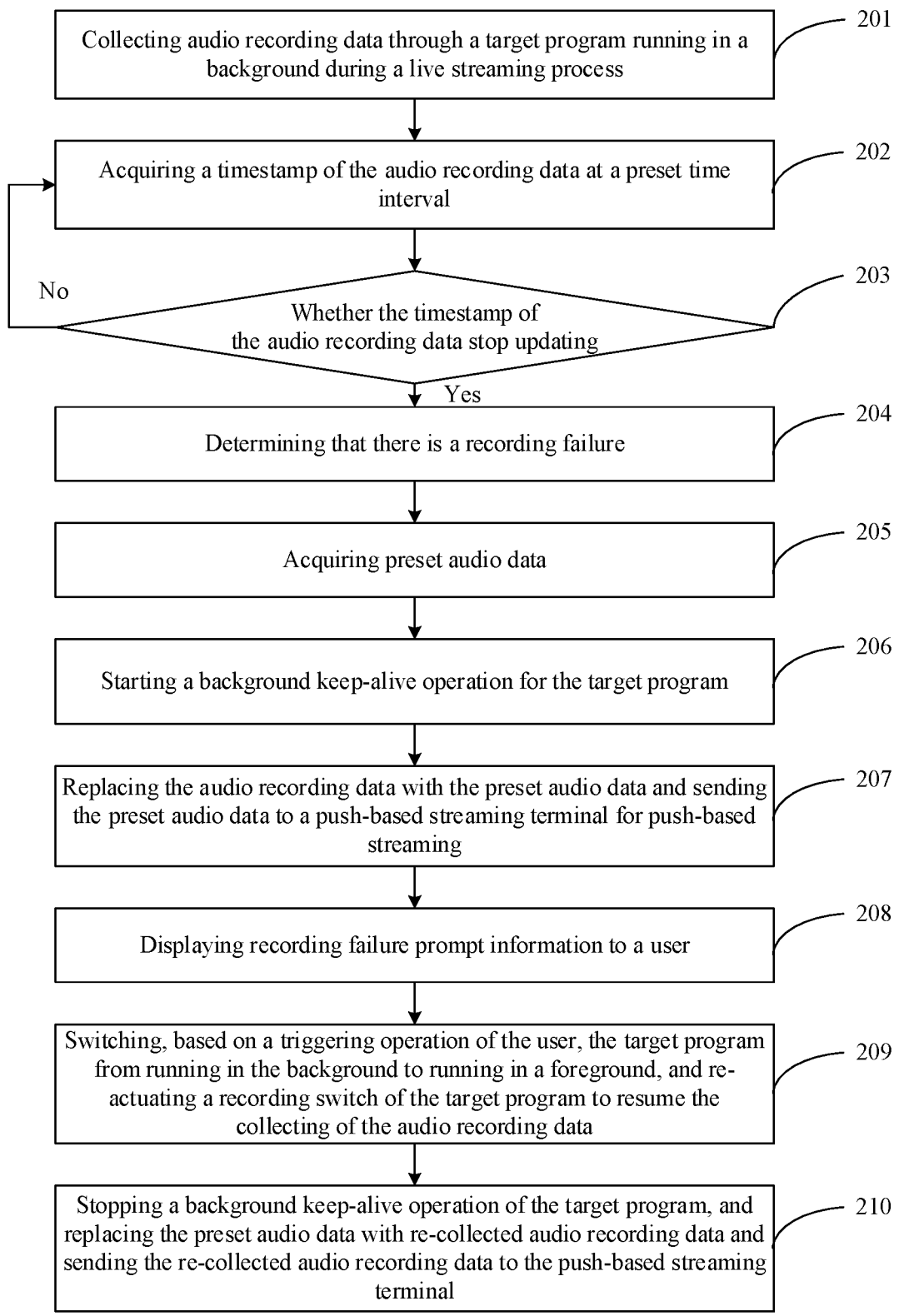
FIG. 3 is a schematic flowchart of another recording and push-based streaming method provided by an embodiment of the present disclosure.

FIG. 3 is a schematic flowchart of another recording and push-based streaming method provided by an embodiment of the present disclosure, which further optimizes the aforementioned recording and push-based streaming method. As shown in FIG. 3, the method includes the following steps.

Step 201, collecting audio recording data through a target program running in a background during a live streaming process.

Step 202, acquiring a timestamp of the audio recording data at a preset time interval.

Step 203, whether the timestamp of the audio recording data stop updating? If yes, proceeding to step 204; otherwise, returning to step 202.

Step 204, determining that there is a recording failure.

After step 204, steps 205 and 206 may be executed, the specific order of execution is not limited, FIG. 2 is only an example.

Step 205, acquiring preset audio data.

The preset audio data is white noise, and the preset audio data has the same size and/or callback and output frequency as the audio recording data.

Step 206, starting a background keep-alive operation for the target program.

In an embodiment, starting the background keep-alive operation for the target program may include: keeping running of the target program in the background by looping target audio data in a silent state.

Step 207, replacing the audio recording data with the preset audio data and sending the preset audio data to a push-based streaming terminal for push-based streaming.

Step 208, displaying recording failure prompt information to a user.

Step 209, switching, based on a triggering operation of the user, the target program from running in the background to running in a foreground, and re-actuating a recording switch of the target program to resume the collecting of the audio recording data.

Step 210, stopping a background keep-alive operation of the target program, and replacing the preset audio data with re-collected audio recording data and sending the re-collected audio recording data to the push-based streaming terminal.

Figure 4:
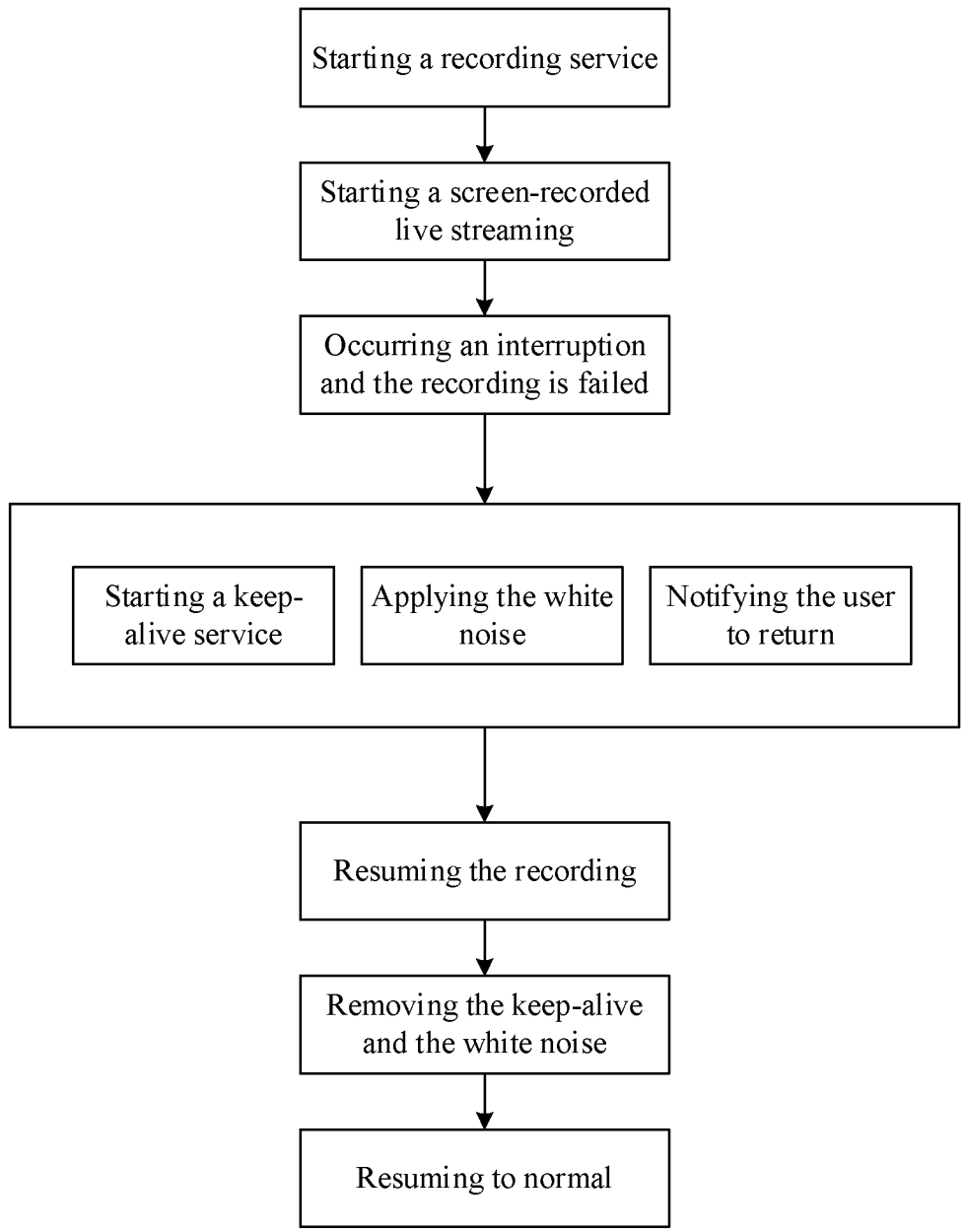
FIG. 4 is a schematic diagram of the recording and push-based streaming provided by an embodiment of the present disclosure.

Next, a specific example will be given to further illustrate the recording and push-based streaming method of an embodiment of the present disclosure. Exemplary, FIG. 4 is a schematic diagram of a recording push-based streaming provided by an embodiment of the present disclosure, and as shown in FIG. 4, taking a screen-recorded live streaming scenario with as an example, the recording may fail due to the operation of other foreground program, such as interruption when a live streaming user actuates the recording switch and starts the screen-recorded live streaming in the live streaming program, and at this time processing is required, which may include: 1, starting a long-term keep-alive service; 2, replacing the original audio output with white noise; 3, guiding, through interaction such as the local notification, the user back to the live streaming program, and then restart the recording service; 4, removing the keep-alive service and white noise service after the recording is resumed, and normal push-based streaming is resumed.

Figure 5:
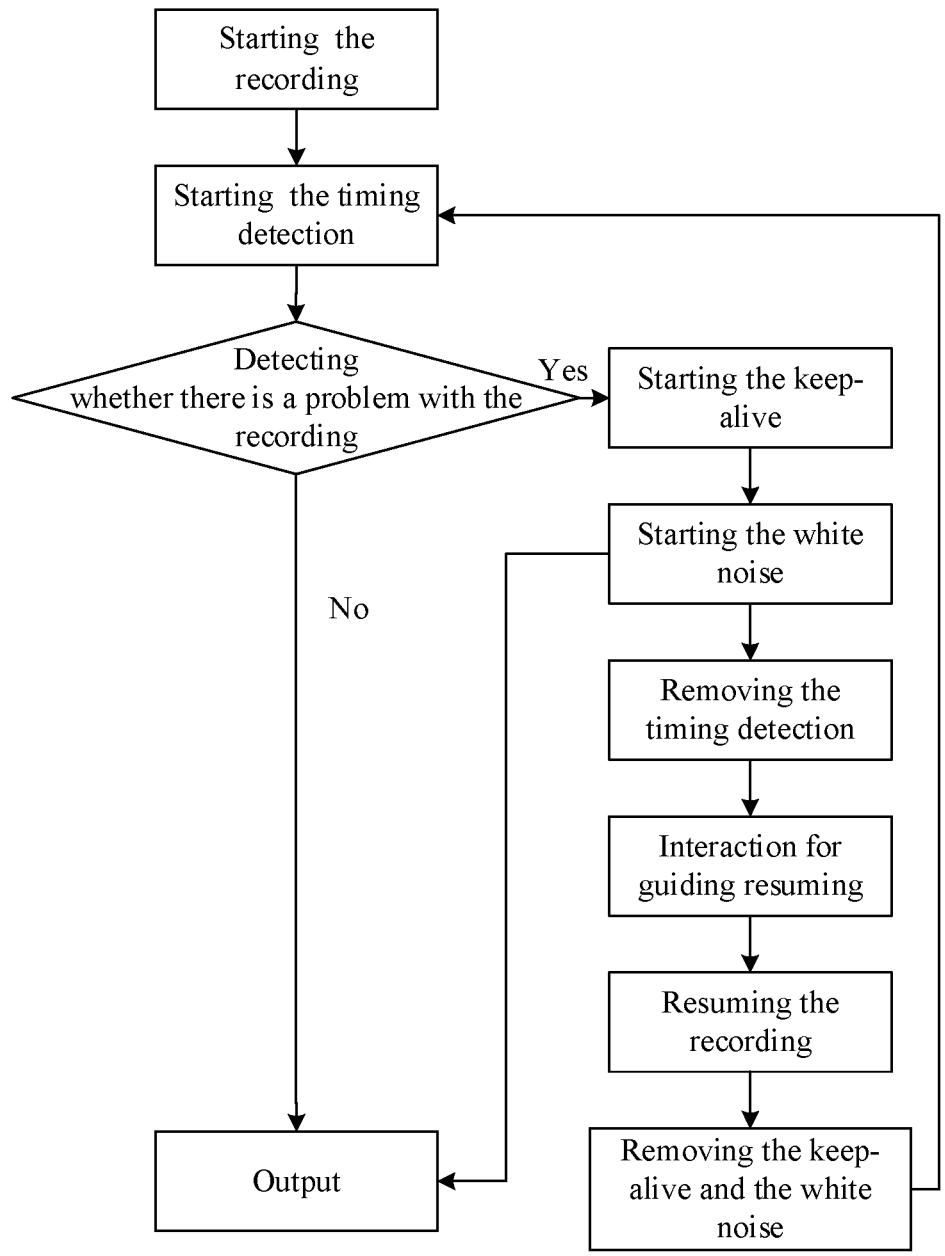
FIG. 5 is a schematic diagram of another recording and push-based streaming provided by an embodiment of the present disclosure.

FIG. 5 is a schematic diagram of another recording and push-based streaming provided by an embodiment of the present disclosure, and as shown in FIG. 5, after the live streaming terminal starts the recording, timing detection may be started to detect whether there is a problem with the recording. If yes, start the keep-alive and white noise, and output the white noise to the push-based streaming terminal, and remove the timing detecting, perform interaction to guide resuming, the keep-alive and white noise may be removed after the recording is resumed, and then return to start the timing detecting. If there is no problem with the recording, the audio data obtained from the recording may be directly output to the push-based streaming terminal.

In this solution, the recording of the live streaming program needs to perform the resuming operation after being cut off, and fake audio data may be provided during the resuming process to ensure normal push-based streaming. This solution provides a stable audio data output solution in the live streaming scenario, which ensures the stability and reliability of the push-based streaming.

The recording and push-based streaming solution provided by the embodiment of the present disclosure collects audio recording data through a target program running in a background during a live streaming process; acquires preset audio data when determining that there is a recording failure; and replaces the audio recording data with the preset audio data and sends the preset audio data to a push-based streaming terminal for push-based streaming. With the above technical solution, the preset audio data may be configured to replace the audio recording data and send the preset audio data to the push-based streaming terminal when the recording is failed during the live streaming process, which ensures the normal push-based streaming of the live streaming to avoid push-based streaming interruption caused by the recording failure, and improve the stability and reliability of push-based streaming for the live streaming.

Figure 6:
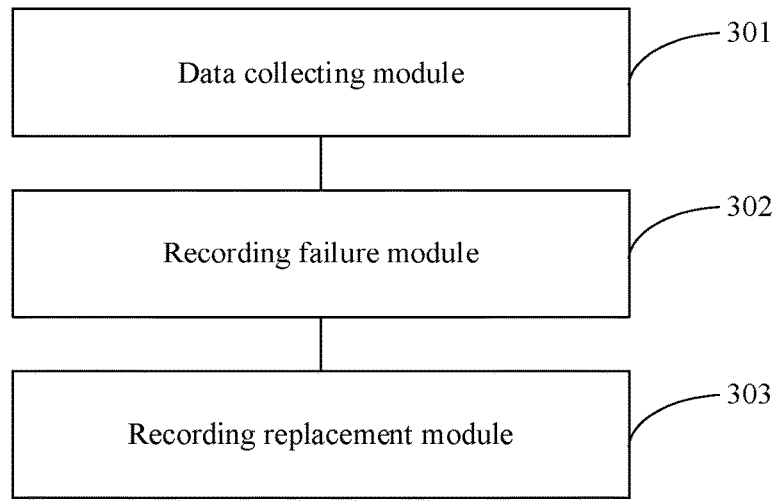
FIG. 6 is a schematic diagram of the structure of a recording and push-based streaming apparatus provided by an embodiment of the present disclosure.

FIG. 6 is a schematic diagram of the structure of a recording and push-based streaming apparatus provided by an embodiment of the present disclosure, the apparatus may be implemented by software and/or hardware and may generally be integrated in an electronic device. As shown in FIG. 6, the apparatus includes:

a data collecting module 301, configured to collect audio recording data through a target program running in a background during a live streaming process;

a recording failure module 302, configured to acquire preset audio data when determining that there is a recording failure; and a recording replacement module 303, configured to replace the audio recording data with the preset audio data and send the preset audio data to a push-based streaming terminal for push-based streaming.

In an embodiment, the recording failure module 302 is specifically configured to:

acquire a timestamp of the audio recording data at a preset time interval; and determine that there is the recording failure when the timestamp of the audio recording data stops updating.

In an embodiment, the preset audio data is white noise, and a size and/or a callback and output frequency of the preset audio data are the same as a size and/or a callback and output frequency of the audio recording data.

In an embodiment, the apparatus further includes a keep-alive module, configured to: after determining that there is the recording failure, start a background keep-alive operation for the target program.

In an embodiment, the keep-alive module is specifically configured to:

keep running of the target program in the background by looping target audio data in a silent state.

In an embodiment, the apparatus further includes a recording resuming module, configured to:

display recording failure prompt information to a user; and switch, based on a triggering operation of the user, the target program from running in the background to running in a foreground, and restart a recording switch of the target program to resume the collecting of the audio recording data.

In an embodiment, the recording resuming module is specifically configured to:

stop a background keep-alive operation of the target program, and replace the preset audio data with re-collected audio recording data and send the re-collected audio recording data to the push-based streaming terminal.

The recording and push-based streaming apparatus provided by the embodiment of the present disclosure may execute the recording and push-based streaming method provided in any of the embodiment of the present disclosure, and has corresponding functional module and beneficial effects for executing the method.

The embodiment of the present disclosure further provides a computer program product including a computer program/instruction that implements the recording and push-based streaming method provided in any of the embodiments of the present disclosure when executed by a processor.

Figure 7:
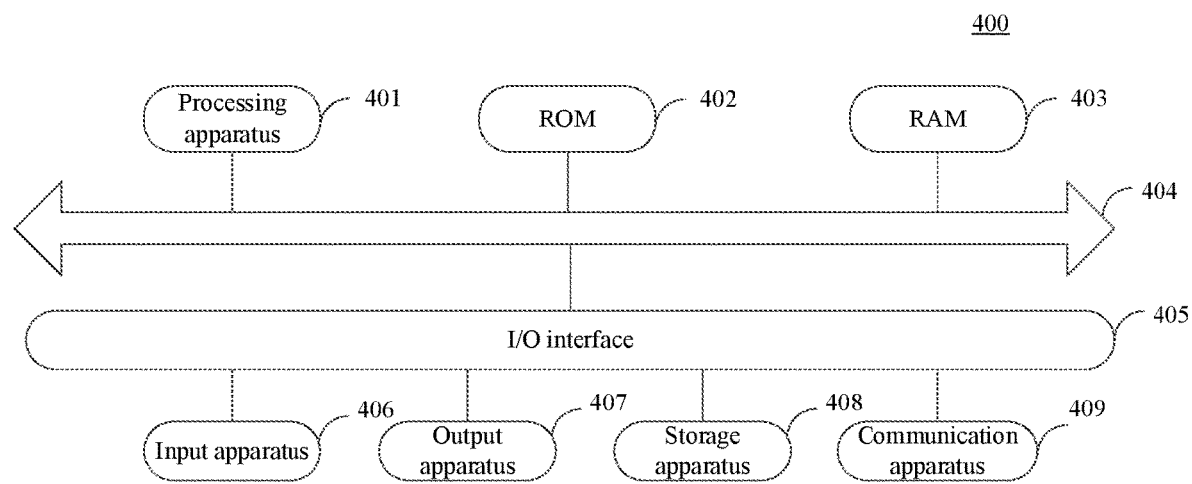
FIG. 7 is a schematic diagram of the structure of an electronic device provided by an embodiment of the present disclosure.

FIG. 7 is a schematic diagram of the structure of an electronic device provided by an embodiment of the present disclosure. Refer to FIG. 7 below for details, FIG. 7 shows a schematic diagram of the structure suitable for implementing the electronic device 400 in the embodiment of the present disclosure. The electronic device 400 in the embodiment of the present disclosure may include, but is not limited to, a mobile terminal, such as a mobile phone, a laptop, a digital broadcasting receiver, PDA (Personal Digital Assistant), PAD (Portable Android Device), PMP (Portable Media Player), a vehicle terminal (such as a vehicle navigation terminal) and the like, and a fixed terminal such as a digital TV, a desktop computer and the like. The electronic device shown in FIG. 7 is only an example and should not impose any limitations on the functionality and scope of use of the embodiment of the present disclosure.

As shown in FIG. 7, the electronic device 400 may include the processing apparatus (such as a central processing unit, graphics processor, etc.) 401 that may perform various appropriate actions and processes based on programs stored in the read only memory (ROM) 402 or loaded from the storage equipment 408 into the random access memory (RAM) 403. In the RAM 403, various programs and data required for the operation of the electronic device 400 are also stored. The processing equipment 401, the ROM 402, and the RAM 403 are connected to each other through the bus 404. The Input/Output (I/O) interface 405 is also connected to the bus 404.

In general, the following equipments may be connected to I/O interface 405: the input equipment 406, such as a touch screen, a touchpad, a keyboard, a mouse, a camera, a microphone, an accelerometer, a gyroscope, etc.; and the output equipment 407, such as a liquid crystal display (LCD), a speaker, a vibrator, etc.; the storage equipment 408, such as magnetic tape, a hard drive, etc.; and the communication equipment 409. The communication equipment 409 may allow the electronic device 400 to communicate wirelessly or wirelessly with the other device to exchange data. Although FIG. 7 illustrates the electronic device 400 with various equipments, it should be understood that it is not required all the equipments shown to be implemented or possessed. More or less equipments could be implemented or possessed alternatively.

Specifically, according to the embodiment of the present disclosure, the process described above with reference to the flowchart may be implemented as a computer software program. For example, the embodiment of the present disclosure includes a computer program product that includes a computer program carried on a non-transitory computer-readable medium, the computer program includes program code for executing the method shown in the flowchart. In such embodiment, the computer program may be downloaded and installed from the network through the communication equipment 409, or installed from the storage equipment 408, or installed from the ROM 402. When the computer program is executed by the processing equipment 401, the above-mentioned functions defined in the recording and push-based streaming method of the embodiment of the present disclosure are executed.

Noted that the computer-readable medium mentioned in the present disclosure may be a computer-readable signal medium, a computer-readable storage medium, or any combination of the two. The Computer readable storage medium may be, for example, but not limited to, a system, an equipment or a component of electricity, magnetism, light, electromagnetism, infrared, or semiconductor, or any combination of the above. A more specific example of the computer-readable storage medium may be, but are not limited to: an electrical connections with one or more wires, a portable computer disk, a hard drive, a random access memory (RAM), a read-only memory (ROM), an erasable programmable read-only memory (EPROM or flash memory), an optical fiber, a portable compact disc read-only memory (CD-ROM), an optical storage component, magnetic storage component, or any suitable combination of the above. In the present disclosure, the computer-readable storage medium may be any tangible medium containing or storing a program, which program may be used by a system, an equipment or a component that execute the instruction or used in combination with a system, an equipment or a component that execute the instruction. In the present disclosure, the computer-readable signal medium may include a data signal propagated in the baseband or as part of the carrier wave, which carry computer-readable program code. This propagation of the data signal may take various forms, including but not limited to a electromagnetic signal, an optical signal, or any suitable combination of the above. The computer-readable signal medium may further be any computer-readable medium other than a computer-readable storage medium, which computer-readable signal medium may send, propagate, or transmit a program that is used by a system, an equipment or a component that execute the instruction or used in combination with a system, an equipment or a component that execute the instruction. The program code contained on the computer readable medium may be transmitted by any suitable medium, including but not limited to: a wire, an optical cables, the radio frequency (RF), etc., or any suitable combination of the above.

In some embodiments, the client and the server may communicate using any currently known or future developed network protocol such as HTTP (HyperText Transfer Protocol), and may interconnect with digital data communication (for example, communication network) in any form or medium. An example of communication network includes the local area network (LAN), the wide area network (WAN), the World Wide Web (such as the Internet), and an end-to-end network (such as an ad hoc end-to-end network), as well as any currently known or future developed network.

The computer readable medium mentioned above may be included in the electronic device mentioned above; or exist separately without being assembled into the electronic device.

The computer readable medium mentioned above carries one or more programs, and when one or more of the programs are executed by the electronic device, the electronic device is enabled to: collect audio recording data through a target program running in a background during a live streaming process; acquire preset audio data when determining that there is a recording failure; and replace the audio recording data with the preset audio data and send the preset audio data to a push-based streaming terminal for push-based streaming.

The computer program code for executing the operations in the disclosure may be written in one or more programming languages or a combination thereof, the programming language includes but not limited to object-oriented programming language such as Java, Smalltalk, C++, as well as conventional procedural programming languages such as "C" or similar programming language. The program code may be completely executed on the user's computer, partially executed on the user's computer, executed as a stand-alone software package, partially executed on the user's computer and partially executed on a remote computer, or completely executed on a remote computer or server. In cases involving a remote computer, the remote computer may be connected to the user's computer through any type of network including the local area network (LAN) or the wide area network (WAN), or may be connected to an external computer (such as using an Internet service provider to connect through the Internet).

The flowchart and block diagram in the accompanying drawings illustrate the possible architecture, function, and operation of the system, method, and computer program product according to various embodiments of the present disclosure. At this point, each box in the flowchart or block diagram may represent a module, program segment, or part of code that contains one or more executable instructions for implementing a specified logical function. It should further be noted that in some alternative implementations, the function indicated in the box may further occur in a different order than those indicated in the accompanying drawings. For example, two consecutive boxes may actually be executed in parallel substantially, and sometimes they may further be executed in the opposite order, which depends on the function involved. It should further be noted that each box in the block diagram and/or flowchart, as well as the combination of boxes in the block diagram and/or flowchart, may be implemented by the dedicated hardware based system that perform a specified function or operation, or may be implemented by a combination of dedicated hardware and computer instruction.

The mentioned unit described in the embodiment of the present disclosure may be implemented through software or hardware. The name of the unit is not used as a limitation to the unit itself in some cases.

The function described above in this article may be at least partially executed by one or more hardware logic components. For example, non limiting examples of the hardware logic component that may be used include: a field programmable gate array (FPGA), an application specific integrated circuit (ASIC), an application specific standard product (ASSP), a system on Chip (SOC), a complex programmable logic device (CPLD), etc.

In the context of the present disclosure, the machine readable medium may be a tangible medium that may contain or store a program for being used by a system, an apparatus or a device that execute the instruction or used in combination with a system, an apparatus or a device that execute the instruction. The machine readable medium may be machine readable signal medium or machine readable storage medium. The Machine readable medium may include but are not limited, a system, an apparatus or a device of electricity, magnetism, light, electromagnetism, infrared, or semiconductor, or any combination of the above. A more specific example of the machine-readable storage medium would include an electrical connection based on one or more lines, a portable computer disk, a hard drive, a random-access memory (RAM), a read-only memory (ROM), an erasable programmable read-only memory (EPROM or flash memory), optical fiber, a portable compact disc read-only memory (CD-ROM), an optical storage device, a magnetic storage device, or any suitable combination of the above.

According to one or more embodiments of the present disclosure, the present disclosure provides a recording and push-based streaming method, including:
  collecting audio recording data through a target program running in a background during a live streaming process;
  acquiring preset audio data when determining that there is a recording failure; and
  replacing the audio recording data with the preset audio data and sending the preset audio data to a push-based streaming terminal for push-based streaming.

According to one or more embodiments of the present disclosure, in the recording and push-based streaming method provided in the present disclosure, the determining that there is the recording failure includes:
  acquiring a timestamp of the audio recording data at a preset time interval; and
  determining that there is the recording failure when the timestamp of the audio recording data stops updating.

According to one or more embodiments of the present disclosure, in the recording and push-based streaming method provided in the present disclosure, the preset audio data is white noise, and a size and/or a callback and output frequency of the preset audio data are the same as a size and/or a callback and output frequency of the audio recording data.

According to one or more embodiments of the present disclosure, after determining that there is the recording failure, the recording and push-based streaming method provided in the present disclosure further includes:
  starting a background keep-alive operation for the target program.

According to one or more embodiments of the present disclosure, in the recording and push-based streaming method provided in the present disclosure, the starting the background keep-alive operation for the target program, includes:
  keeping running of the target program in the background by looping target audio data in a silent state.

According to one or more embodiments of the present disclosure, the recording and push-based streaming method provided in the present disclosure further includes:
  displaying recording failure prompt information to a user; and
  switching, based on a triggering operation of the user, the target program from running in the background to running in a foreground, and restarting a recording switch of the target program to resume the collecting of the audio recording data.

According to one or more embodiments of the present disclosure, the recording and push-based streaming method provided in the present disclosure further includes:
  stopping a background keep-alive operation of the target program, and replacing the preset audio data with re-collected audio recording data and sending the re-collected audio recording data to the push-based streaming terminal.

According to one or more embodiments of the present disclosure, a recording and push-based streaming apparatus is provided, including:
- a data collecting module, configured to collect audio recording data through a target program running in a background during a live streaming process;
- a recording failure module, configured to acquire preset audio data when determining that there is a recording failure; and
- a recording replacement module, configured to replace the audio recording data with the preset audio data and send the preset audio data to a push-based streaming terminal for push-based streaming.

According to one or more embodiments of the present disclosure, in the recording and push-based streaming apparatus provided in the present disclosure, the recording failure module is specifically configured to:
- acquire a timestamp of the audio recording data at a preset time interval; and
- determine that there is the recording failure when the timestamp of the audio recording data stops updating.

According to one or more embodiments of the present disclosure, in the recording and push-based streaming apparatus provided in the present disclosure, the preset audio data is white noise, and a size and/or a callback and output frequency of the preset audio data are the same as a size and/or a callback and output frequency of the audio recording data.

According to one or more embodiments of the present disclosure, the recording and push-based streaming apparatus provided in the present disclosure further includes a keep-alive module, configured to, after determining that there is the recording failure,
- start a background keep-alive operation for the target program According to one or more embodiments of the present disclosure, for the recording and push-based streaming apparatus provided in the present disclosure, the keep-alive module is specifically configured to:
- keep running of the target program in the background by looping target audio data in a silent state.

According to one or more embodiments of the present disclosure, the recording and push-based streaming apparatus provided in the present disclosure further includes a recording resuming module, configured to:
- display recording failure prompt information to a user; and
- switch, based on a triggering operation of the user, the target program from running in the background to running in a foreground, and restart a recording switch of the target program to resume the collecting of the audio recording data.

According to one or more embodiments of the present disclosure, in the recording and push-based streaming apparatus provided in the present disclosure, the recording resuming module is specifically configured to:
- stop a background keep-alive operation of the target program, and replace the preset audio data with re-collected audio recording data and send the re-collected audio recording data to the push-based streaming terminal.

According to one or more embodiments of the present disclosure, an electronic device is provided, including:
- a processor;
- a memory, configured to store an executable instruction of the processor;
- the processor is configured to read the executable instruction from the memory and execute the instruction to enable the electronic device to implement any one of the recording and push-based streaming methods provided in the present disclosure.

According to one or more embodiments of the present disclosure, the present disclosure provides a computer-readable storage medium that stores a computer program that, when executed by a computing device, the computer program enables the computing device to implement any one of the recording and push-based streaming methods provided in the present disclosure.

According to one or more embodiments of the present disclosure, the present disclosure provides a computer program product that, when running on a computing device, the computer program product enables the computing device to implement any one of the recording and push-based streaming methods provided in the present disclosure.

According to one or more embodiments of the present disclosure, the present disclosure provides a computer program that, when executed by a processor, the computer program implements any one of the recording and push-based streaming methods provided in the present disclosure.

The above description is only preferred embodiments of the present disclosure and an explanation of applied technical principles. Persons skilled in the art should understand that disclosed scope involved in the present disclosure is not limited to technical solutions formed by specific combinations of the above technical features, but also covers other technical solutions formed by any combination of the above technical features or their equivalent features without departing from the above disclosed concept. For example, a technical solution formed by mutually replacing the above features with technical features with similar functions disclosed in the present disclosure (but not limited to).

In addition, although operations are depicted in a particular order, this should not be understood as requiring these operations to be performed in the particular order shown or in sequential order. Under certain circumstances, multitasking and parallel processing may be beneficial. Similarly, although the above discussion contains a number of specific implementation details, these should not be interpreted as limitations on the scope of the present disclosure. Some features described in the context of separate embodiments may also be implemented in a single embodiment in combination. On the contrary, various features described in the context of a single embodiment may also be implemented in a plurality of embodiments individually or in any suitable sub-combination.

Although the subject matter has been described in language specific to structural features and/or logical actions of methods, it should be understood that the subject matter defined in the appended claims is not necessarily limited to the specific features or actions described above. On the contrary, the specific features and actions described above are only exemplary forms of implementing the claims.

What is claimed is:

1. A recording and push-based streaming method, comprising: collecting audio recording data during a live streaming process;
   - acquiring preset audio data when determining that there is a recording failure; and
   - replacing the audio recording data with the preset audio data and sending the preset audio data to a push-based streaming terminal for push-based streaming.

2. The method according to claim 1, wherein the determining that there is the recording failure comprises:
  acquiring a timestamp of the audio recording data at a preset time interval; and
  determining that there is the recording failure when the timestamp of the audio recording data stops updating.

3. The method according to claim 1, wherein the preset audio data is white noise, and a size and/or a callback and output frequency of the preset audio data are the same as a size and/or a callback and output frequency of the audio recording data.

4. The method according to claim 1, wherein after determining that there is the recording failure, the method further comprises:
  starting a background keep-alive operation for the target program.

5. The method according to claim 4, wherein the starting the background keep-alive operation for the target program comprises:
  keeping running of the target program in the background by looping target audio data in a silent state.

6. The method according to claim 1, further comprising:
  displaying recording failure prompt information to a user; and
  switching, based on a triggering operation of the user, the target program from running in the background to running in a foreground, and restarting a recording switch of the target program to resume the collecting of the audio recording data.

7. The method according to claim 1, further comprising:
  stopping a background keep-alive operation of the target program, and replacing the preset audio data with re-collected audio recording data and sending the re-collected audio recording data to the push-based streaming terminal.

8. A recording and push-based streaming apparatus, comprising:
  at least one processor and a memory;
  the memory stores a computer executable instruction; and
  the at least one processor executes the computer executable instruction stored in the memory to enable the at least one processor to:
    collect audio recording data during a live streaming process;
    acquire preset audio data when determining that there is a recording failure; and
    replace the audio recording data with the preset audio data and sending the preset audio data to a push-based streaming terminal for push-based streaming.

9. A non-transitory computer-readable storage medium, wherein the non-transitory computer-readable storage medium stores a computer program that, when executed by a computing device, the computer program enables the computing device to:
  acquire audio recording data during a live streaming process;
  acquire preset audio data when determining that there is a recording failure; and
  replace the audio recording data with the preset audio data and send the preset audio data to a push-based streaming terminal for push-based streaming.

10. The method according to claim 2, wherein the preset audio data is white noise, and a size and/or a callback and output frequency of the preset audio data are the same as a size and/or a callback and output frequency of the audio recording data.

11. The method according to claim 2, wherein after determining that there is the recording failure, the method further comprises:
  starting a background keep-alive operation for the target program.

12. The method according to claim 3, wherein after determining that there is the recording failure, the method further comprises:
  starting a background keep-alive operation for the target program.

13. The method according to claim 2, further comprising:
  displaying recording failure prompt information to a user; and
  switching, based on a triggering operation of the user, the target program from running in the background to running in a foreground, and restarting a recording switch of the target program to resume the acquiring of the audio recording data.

14. The method according to claim 3, further comprising:
  displaying recording failure prompt information to a user; and
  switching, based on a triggering operation of the user, the target program from running in the background to running in a foreground, and restarting a recording switch of the target program to resume the acquiring of the audio recording data.

15. The recording and push-based streaming apparatus according to claim 8, wherein the at least one processor is further enabled to:
  acquire a timestamp of the audio recording data at a preset time interval; and
  determine that there is the recording failure when the timestamp of the audio recording data stops updating.

16. The recording and push-based streaming apparatus according to claim 8, wherein the preset audio data is white noise, and a size and/or a callback and output frequency of the preset audio data are the same as a size and/or a callback and output frequency of the audio recording data.

17. The recording and push-based streaming apparatus according to claim 8, wherein after determining that there is the recording failure, the at least one processor is further enabled to start a background keep-alive operation for the target program.

18. The recording and push-based streaming apparatus according to claim 17, wherein the at least one processor is further enabled to:
  keep running of the target program in the background by looping target audio data in a silent state.

19. The recording and push-based streaming apparatus according to claim 8, wherein the at least one processor is further enabled to:
  display recording failure prompt information to a user; and
  switch, based on a triggering operation of the user, the target program from running in the background to running in a foreground, and restart a recording switch of the target program to resume the acquiring of the audio recording data.

20. The recording and push-based streaming apparatus according to claim 8, wherein the at least one processor is further enabled to:
  stop a background keep-alive operation of the target program, and replace the preset audio data with re-acquired audio recording data and send the acquired audio recording data to the push-based streaming terminal.

* * * * *